United States Patent [19]
Burkett et al.

[11] 3,929,505
[45] Dec. 30, 1975

[54] FORMATION OF BATTERY PLATES
[75] Inventors: Wilford B. Burkett, Pacific Palisades; Joseph A. Orsino, Calabasas Park, both of Calif.
[73] Assignee: McCulloch Corporation, Los Angeles, Calif.
[22] Filed: June 27, 1973
[21] Appl. No.: 374,265

Related U.S. Application Data
[63] Continuation of Ser. No. 136,833, April 23, 1971, abandoned.

[52] U.S. Cl. .................................. 136/34; 136/76
[51] Int. Cl.[2] ........................................ H01M 35/30
[58] Field of Search ....... 136/34, 76, 27, 75, 28–29; 320/2.4, 14, 13, 21, 24

[56] References Cited
UNITED STATES PATENTS
2,503,179   4/1950   Tichenor ............................. 320/14
2,518,527   8/1950   Daily .................................... 136/34
2,594,714   4/1952   Andre ................................... 136/34
2,637,836   5/1953   Kendall et al. ..................... 136/34 X
2,650,257   8/1953   Jolley .................................. 136/34

Primary Examiner—Anthony Skapars
Attorney, Agent, or Firm—Burns, Doane, Swecker & Mathis

[57] ABSTRACT

Plates for batteries are formed by applying formation current and intermittently depolarizing the plates and electrolyte at either preselected intervals or in response to one or more monitored characteristics of the plates and electrolyte. Plates for lead-acid batteries are formed while immersed in either a dilute solution of sulfuric acid or the solution to be used as the electrolyte in the battery. The formation current for plates for lead-acid batteries is in excess of 20 times the usual formation current and may be more than 100 times the usual formation current.

14 Claims, 5 Drawing Figures

FIG_2

FORMATION OF BATTERY PLATES

Related Application

This application is a continuation of U.S. Ser. No. 136,833, filed Apr. 23, 1971, now abandoned.

BACKGROUND OF THE INVENTION

1. Field of the Invention

This invention relates to the formation of battery plates, and more particularly to the rapid formation of plates.

2. Prior Art

Plates for storage batteries, and in particular plates for lead-acid batteries, are formed by changing the composition of the plates, which change in composition is effected by the application of a formation current to the plates when immersed in a solution that chemically and electrically reacts with the material of the plates. Plates for lead-acid batteries are generally either of the pasted type or the Plante type. A discussion of the preparation and formation of pasted plates and of Plante plates is set forth at pages 27–46 and 46–51, respectively of the text entitled "Storage Batteries", 4th Edith, John Wiley and Sons Inc. by George Wood Vinal.

Plates for alkaline batteries may be any one of a number of types, depending on the electrochemically active material used. For example, the positive electrode for a nickel-cadmium cell may be composed of nickel and cobalt in pocket type cells or sintered nickel powder in sintered type cells. A discussion of the preparation and formation or activation of these plates is set forth in the text entitled "Alkaline Storage Batteries" by S. Uno Falk and Alvin J. Salkind and published by John Wiley and Sons Inc. at pages 42–233 and also in the Vinal text at pages 85–102.

For pasted plates for lead acid batteries, the paste is mixed and applied to the grid and dried. Thereafter, the plates are formed by electrolytically oxidizing and reducing the plates in dilute sulfuric acid or a sulfate solution. This formation process typically takes between 45 and 50 hours, according to the Vinal text. Also, as noted in Vinal, the charge may be interrupted and the plates discharged to counteract the tendency to overformation and softening of the positive active material. This step undoubtedly adds to the total time of formation.

The strength and amount of sulfuric acid used in forming the plates depends upon the previous treatment of the plates and is usually in the range of 1.050 to 1.150 specific gravity. According to Vinal, increasing the strength of the acid increases the time required for forming the positive plates. The formation current depends on the thickness and type of the plates and on the temperature, and it is stated in the Vinal text that for plates in general, a current density of 2 to 5 amperes per square foot or 0.014 to 0.035 amperes per square inch was reasonable.

In the formation of plates for lead acid batteries, the assembled elements are allowed to stand in a forming solution for several hours, in addition to the 45 to 50 hours of application of forming current. After the formation is completed, it is the practice to pour out the electrolyte and replace it with acid of a strength that will result in the specific gravity that is generally employed in storage batteries, which is typically between 1.260 and 1.280 specific gravity for batteries of the automotive type. The typical formation of pasted plates set forth in Vinal text is lengthy and a large space is required in which to produce batteries. Attempts have been made to reduce the time of formation, which attempts have been generally expensive and unsatisfactory. One particular attempt involved the circulation of a refrigerated electrolyte so that a higher formation current could be employed. By this method the plates could be formed in approximately seven hours. However, the equipment was expensive and the reduction in time did not offset the increase in expenses.

Plates for alkaline batteries such as nickel-cadmium batteries may also be formed by passing formation current through the plates. A typical formation process set forth in the Falk et al text (pages 138–139) requires 55 hours for the portion of the formation during which formation current is applied.

Attempts have been made to reduce this time. One approach for forming positive nickel plates involves combining two anodic oxidation processes where the plaque is first treated in a solution of sodium bicarbonate and thereafter in a solution of potassium carbonate. While in the first solution of sodium bicarbonate, a formation current of direct current pulses having a high mean amperage is applied for approximately 1 hour to produce nickel hydroxide. The anodic oxidation is then completed in an alkali metal carbonate, such as a potassium carbonate solution. The formation current is substantially reduced and applied continuously for 2 ¾ hours with a higher rate discharge for ¼ hour. This cycle is repeated for a total cycle time of 18 hours, so that the formation is completed in 19 hours. For a 3.2 amperes hour per square decimeter of positive plate capacity, the formation current in this approach, while the plaque is immersed in the potassium carbonate solution, is between 1.3 and 1.7 amperes per square decimeter.

SUMMARY OF THE INVENTION

Plates may be formed in accordance with this invention in substantially less time than 40 to 50 hours and without elaborate and expensive refrigeration equipment. In particular, pasted plates can be formed in less than one hour without elaborate and expensive refrigeration equipment in accordance with this invention. Pasted plates may be formed in a minimum amount of time by applying a formation current and intermittently depolarizing the plates and electrolyte during formation. Depolarization is advantageously accomplished by reversing the current through the plates either at preselected intervals or in response to one or more characteristics of the plates and electrolyte which change as formation progresses. The characteristics which change and which may be monitored for either reversing the current for depolarizing or for terminating the forming of the plates are the potential of each plate, the voltage between the plates, the amount of gassing, the composition and color of the plates, the weight of the plates, the temperature of the electrolyte, the temperature of the plates, and the composition of the electrolyte.

The formation current, in accordance with this invention, is in excess of 20 times the typical formation current set forth in the Vinal text for lead-acid batteries. The reverse current during depolarization may have a peak value also in excess of 20 times the typical formation currents set forth in the Vinal text. For very rapid formation, the formation current is in excess of the nominal one-hour rate of the cell in which the plates are employed, and as a typical example the formation current has a value of approximately 3 amperes per square inch or 432 amperes per square foot of positive plate area for very rapid formation. The alternate application of formation current and depolarizing is continued until the plates are formed as determined by monitoring one of the characteristics that changes during formation or for a preselected interval of time.

In addition to substantially reducing the time it takes to form a plate, the number of times that the plates have to be handled is decreased in accordance with this invention by employing a higher specific gravity electrolyte in the formation process. As a consequence, the electrolyte does not have to be replaced, but may serve as the electrolyte for the battery. The specific gravity of the solution employed in formation of plates for lead-acid batteries may, in accordance with this invention, be in excess of 1.150 and may further advantageously be between 1.180 and 1.200, depending on the expected use and the resultant specific gravity desired. Specific gravity, as used in this application, is the relative masses of equal volumes of the solution and of water, each being at a temperature of 25°C.

Plates for alkaline batteries may also be formed or activated by employing the method and apparatus of this invention.

DESCRIPTION OF THE DRAWINGS

The above and other features and advantages of the invention may be understood more clearly and fully upon consideration of the following specification and drawings in which.

DESCRIPTION OF THE PREFERRED EMBODIMENTS

Certain plates for use in batteries must be changed in composition during the production of the batteries. In particular, pasted plates for use in lead-acid batteries and certain plates for use in alkaline batteries must be changed in composition during the production of the batteries. For example, a pasted plate designed for the negative electrode of a lead-acid battery typically comprises a mixture of lead, lead oxide, and lead sulfate with a minimum percentage of expanders. The expanders generally employed are barium sulfate, lignin, and carbon black. The composition of a negative plate is representatively shown at the top of the left hand column of FIG. 1. A typical paste contains approximately 83.3 percent lead oxide, 15 percent of lead sulfate, 1 percent of lead, and .7 percent of expanders.

The paste for a positive plate is similar in composition to the negative plate except for the expanders which are not included in the mixture for the positive plate. The composition of a positive plate is representatively shown at the top of the right hand column of FIG. 1. The positive plate may also include red lead or minium in addition to the lead oxide and lead sulfate. A typical proportion for a positive plate is 1 percent lead, 74 percent lead oxide, 15 percent lead sulfate, and 10 percent red lead. If the red lead is omitted, the amount of lead oxide is generally increased.

The paste is mixed and applied to a grid which may be composed of pure lead or may have some other composition as desired. A number of typical compositions for the grids are set forth at pages 27–30 of the Vinal text. The grids themselves do not actively take part in the conversion from chemical energy to electrical energy, and vice versa, in the batteries and for the purposes of this invention it will be assumed that the grids are comprised of pure lead. After the paste is applied to the grid and has been cured, the pasted plate is immersed in an electrolyte for the forming process wherein the positive and negative plates are electrolytically oxidized and reduced to change their composition.

Figure 1:
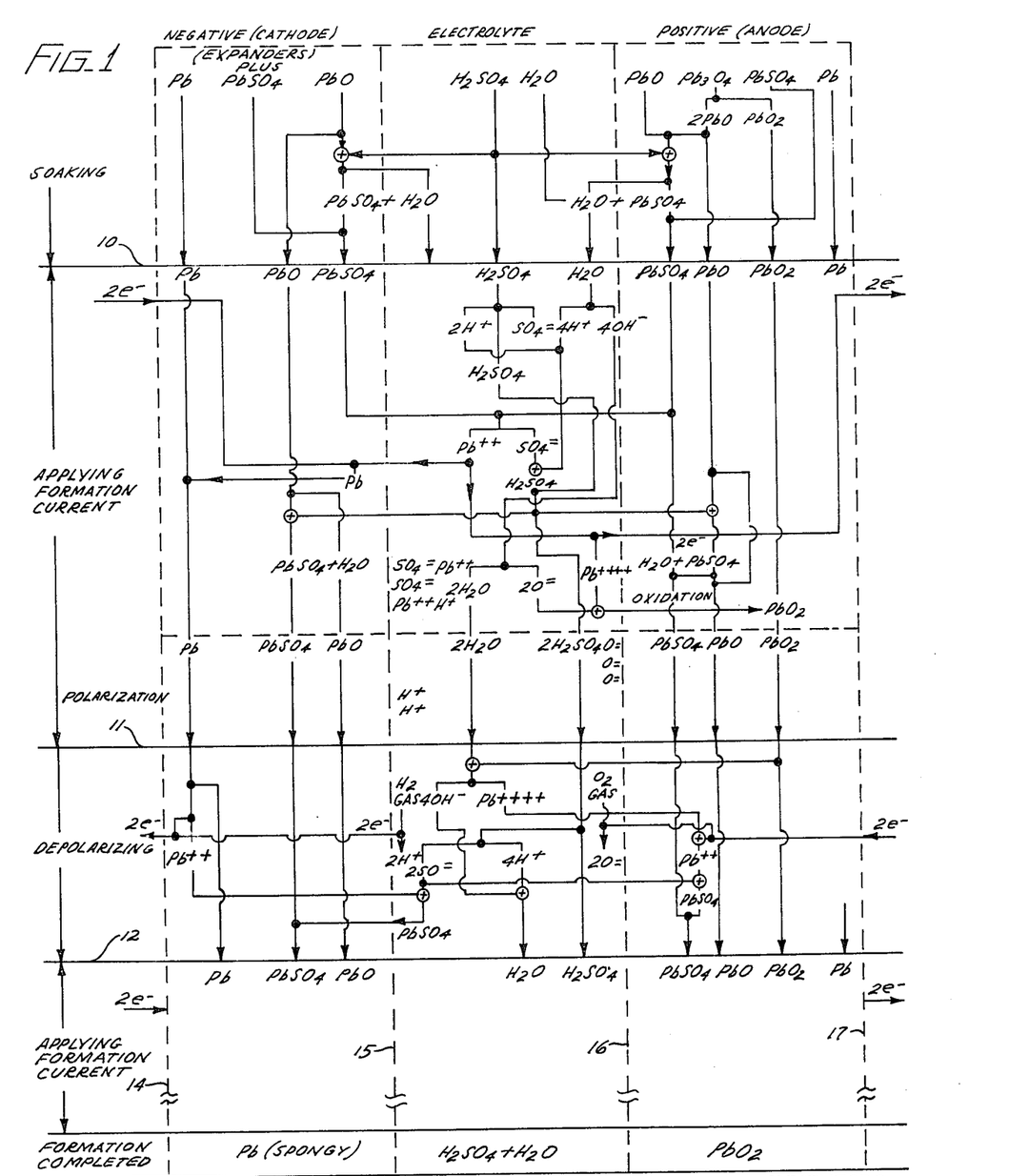
FIG. 1 is a diagram pictorially representing the chemical and electrochemical reactions during formation of plates in accordance with the present invention.

The reactions that take place during the change in composition are diagrammatically shown in FIG. 1. At least one negative plate and one positive plate are initially immersed in electrolyte solution for soaking of the plates. This is represented by the area above the first solid line 10 in FIG. 1. For purposes of illustration, a single negative plate and a single positive plate will be discussed, but it is to be understood that the plates of FIG. 1 may represent a plurality of negative plates and positive plates.

During the soaking step lead sulfate is chemically produced by the dissolving of some of the lead oxide of the plates in the sulfuric acid solution. The sulfuric acid solution is represented by the middle column in FIG. 1 and is typically 10 percent sulfuric acid in water. The solution concentration will typically be between 5 percent and 15 percent sulfuric acid by weight. When the solution concentration is referred to in this application, it is in all cases with respect to weight unless otherwise noted. It has been found that the lead sulfate which must be dissolved in the sulfuric acid solution during the formation process is most soluble in a 10 percent solution of sulfuric acid. This is set forth at page 183 of the Vinal text.

After the plates have been soaked in the dilute sulfuric acid solution, a formation current is applied during an interval of time which is representatively shown between the first solid line 10 and a second solid line 11 in FIG. 1. Upon the application of formation current, the lead sulfate in the plates passes into the solution and ionizes, and divalent lead and divalent sulfate ions result. The water in the electrolyte also ionizes by disassociation as rapidly as equilibrium conditions permit and hydrogen ions and hydroxyl ions result. The divalent lead ions near the negative plate take up two electrons furnished by the source of formation current and are deposited or plated out as solid lead on the negative plate. This is the reduction that takes place at the negative plate during the formation process. The divalent lead ions at and near the positive plate are forced to give up electrons, which changes these lead ions to tetravalent lead ions. The tetravalent lead ions then unite with two oxygen ions, which are supplied by the hydroxyl ions from the water to form lead dioxide, which is deposited upon the positive plate. Thus, oxidation takes place at the positive plate during the formation process. The sulfate ions, which are formed at each plate when the lead sulfate dissolves in the electrolyte, unite with two hydrogen ions to form sulfuric acid at each plate for the regeneration of the sulfuric acid in the solution.

During the application of the formation current, the potential of the plates changes. This potential may be measured by employing a third electrode that does not take part in the formation process. The potential in the positive plate with respect to a third electrode such as cadmium increases as the formation progresses and at a cell potential of about 2.3 volts the hydrogen ions will take on electrons and become hydrogen gas. This hydrogen gas will collect around the negative plate and restrict the access to the surface of the plate by the divalent lead ions and also the hydroxyl ions. Similarly, oxygen gas will form a barrier around the positive plate to impede the formation process. Polarization results, which causes an increase in temperature of the plates and electrolyte and which slows down the formation process. It is generally accepted that polarization may be divided into three categories. These are activation polarization, concentration polarization, and ohmic polarization. A discussion of polarization is set forth at pages 539–559 of the Falk et al text. The polarization due to the formation of the hydrogen gas and of the oxygen gas is a type of activation polarization. A type of concentration polarization also takes place at high current densities. It appears that the electrons are pumped into the negative electrodes faster than the divalent lead ions are able to travel to the negative plate and concentration polarization results. To overcome the polarization effects, the plates are depolarized during an interval of time representatively shown between solid lines 11 and 12 in FIG. 1. The plates and electrolyte are depolarized by reversing the current through the plates as shown in FIG. 1.

The consequences of current reversal on the plates and electrolyte are not completely understood. However, the termination of gassing has been observed and the ability to form plates in substantially less time than 45 to 50 hours, for example, in 1 hour, has been proven.

Apparently it is desirable that the reverse current have just that magnitude and duration which removes the polarization effects only and does not discharge the plates. Thus, the reverse current should ionize the hydrogen gas and oxygen gas and provide time for the divalent lead ions to travel to the negative plate. On reversing the current, the hydrogen gas gives up electrons and becomes hydrogen ions again, which can combine with the hydroxyl ions to form water. Similarly, the oxygen gas acquires two electrons and becomes oxygen ions, which can combine with the tetravalent lead ions to form lead dioxide upon the reapplication of formation current.

If the current is reversed too long, the plates may discharge as follows: With the continued reversal of current, the solution pressure of the lead at the negative plate causes it to throw lead ions into the solution. The lead ions are in the divalent state and the plate gains two electrons for each atom of lead thrown off. The divalent lead ions react with the sulfate ions of the sulfuric acid to form lead sulfate which is deposited on the plates. At the positive plate the lead dioxide, although insoluble in appreciable amounts in sulfuric acid under ordinary conditions, may pass into solution to a limited extent when the current flows according to the following equation:

$$PbO_2 + 2H_2O \rightleftarrows Pb(OH)_4 \rightleftarrows Pb^{++++} + 4OH^-$$

Additionally, the tetravalent lead can acquire two electrons and combine with the sulfate ion to produce lead sulfate. The lead sulfate will then deposit upon the plates. Some discharging may also be beneficial in the rapid formation of plates.

It appears from observing the electrodes in a transparent container during the application of formation current and during the depolarizing step of the method of formation in accordance with this invention that the electrolyte is agitated during the reversal of current. The current is reversed either for a selected interval of time or for an interval of time dependent upon one of the characteristics of the plates and electrolyte that change during the formation of the plates.

In the making of the plates preparatory to applying formation current, the negative plate becomes coated with white lead sulfate. During the formation process the negative plate changes from lead oxide and lead sulfate to a spongy lead, which is gray in appearance. The positive plate follows the same steps through soaking and during formation becomes dark chocolate in color and primarily lead dioxide. The lead dioxide, of course, is a consequence of the oxidation at the positive plate. The repeating of the steps during formation to change the plates to their desired composition is represented by the break below solid horizontal line 12 in the vertical lines 14, 15, 16, and 17 which represent the boundaries of the negative and positive plates and the electrolyte in FIG. 1.

During the formation process there will be gas generated as noted above which will increase in quantity as the formation progresses. Additionally, as polarization takes place, there will be increased resistance to the flow of current through the plates and electrolyte and the temperature of the plates and electrolyte will increase. As the plates are formed, the potential of the positive plate becomes more positive and the potential of the negative plate becomes more negative. The algebraic sum of these potentials is the cell voltage which increases as formation takes place. In addition to these characteristics of the plates and electrolyte that change, the weight of the plates changes and the specific gravity of the electrolyte also changes during formation.

In one illustrative non-limiting example, plates designed for use in a 200 ampere hour battery having a nominal voltage of 6 volts have been rapidly formed in accordance with this invention. The plates had a dimension of 1/10 inch thickness for positive and 8/100 inch thickness for negative and were 6 ½ inches in height and 5 ⅝ inches in width. A single positive plate and a single negative plate may be formed at one time or a plurality of such plates may be formed at one time in accordance with this invention. In the 200 ampere hour battery, 9 positive plates of the above dimensions were formed with 10 negative plates.

After being soaked in a tank in a dilute sulfuric acid solution of approximately 10 percent concentration, the plates that are to become the positive plates were made the anode in the forming tank and the plates for the negative were made the cathode. A formation current of 3.4 amperes per square inch of positive plate surface area, or approximately 125 amperes per plate, was caused to flow through the positive plates. This current is approximately 85 times the upper limit suggested in the Vinal text and 170 times the lower limit suggested.

This current is also approximately 100 times the nominal 24 discharge rate of the individual cells of the battery. The cells having 9 positive plates and 10 negative plates are connected three in series. By this connection a 200 amp-hour battery is made up of cells having a rating of approximately 200 amp-hours and thus a nominal 20-hour discharge rate of approximately 10 amperes.

In forming these plates the cell voltage was monitored and each time the voltage reached 3.15 volts, the current was reversed for approximately 50 milliseconds. The reverse current had a peak value of 1200 amperes or approximately 125 amperes per positive plate. The current reversal occurred approximately once every 15 seconds during the early stages of formation and increased in frequency to approximately once every 8 seconds near the end of formation.

The plates were completely formed in 30 minutes, as compared to the 45 to 50 hours taken in the past.

Figure 2:
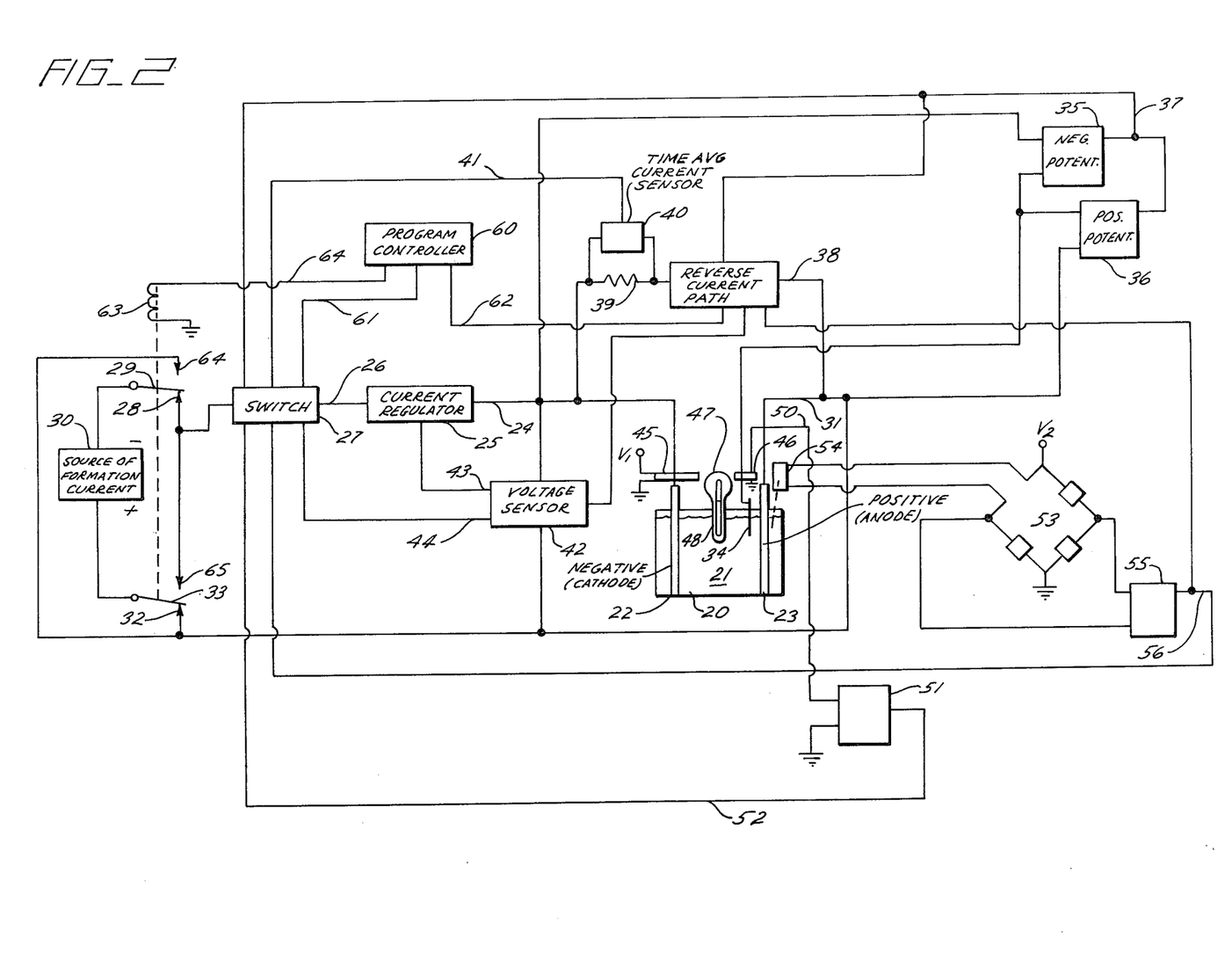
FIG. 2 is a block diagram of apparatus for rapidly forming plates in accordance with the present invention.

The basic method of this invention requires an apparatus comprising a container for the single or plural positive plates and the single or plural negative plates and the electrolyte, a source of formation current, a path from the source to the plates for formation current, and a path for reverse current through the plates. The path of reverse current may if desired include the source of formation current with a polarity reversed to drive the current in the reverse direction through the plates. An apparatus for forming plates in accordance with the present invention is shown in block form in FIG. 2. The apparatus of FIG. 2 includes components in addition to the above enumerated components that are required to practice the basic method of plate formation in accordance with this invention. In practicing the basic method, the depolarization step may be accomplished in response to the attainment of a predetermined value of one of the characteristics that changes during formation. Alternatively the depolarization step may take place automatically at the end of preselected intervals according to an established program of formation. Additionally the application of formation current with intermittent depolarization may be terminated after a preselected interval of time in accordance with an established program or it may be terminated in response to the attainment of a preselected value of one of the characteristics or upon the conversion of the negative plate to spongy lead and the positive plate to lead dioxide as evidenced by the color of the plates. The apparatus of FIG. 2 provides for the alternative monitoring of each of the characteristics that changes during formation of the plates and also provides for alternative types of sources of formation current and alternative ways of depolarizing the plates and electrolyte during formation. In practice only one of the characteristics will generally be monitored for depolarizing and for terminating the formation or, alternatively, an established program of formation and termination will be employed. However, the apparatus shown in block form in FIG. 2 includes means for sensing all of the characteristics as well as means for forming the plates in accordance with an established program.

In FIG. 2 there is a container 20 in which the plates, which may be a plurality of negative and positive plates, are immersed in a sulfuric acid or sulfate solution 21. The negative plates are represented by a single plate 22 and the positive plates are represented by a single plate 23. As noted above, there will generally be one more negative plate than there are positive plates and as a typical example, for a 200 amp-hour battery, there will be 9 positive plates and 10 negative plates having a dimension of 1/10 inch by 5 ⅝ inches by 6 ½ inches for positive and 8/100 by 5 ⅝ by 6 ½ inches for negative. The negative plate 22 is connected as a cathode through a wire 24, a current regulator 25, a wire 26, a switch 27, and a lower fixed contact 28 and a movable contact 29 to the negative side of a source of formation current 30. The positive plate 23 is connected through a line 31 and a bottom fixed terminal 32 and a movable contact 33 to the positive side of the source 30. The current regulator 25 may of course be connected in the positive plate circuit or may be excluded altogether. Similarly the switch 27 may be connected in the positive plate circuit or excluded altogether, as may the movable and fixed contacts 29, 28, and 33, 32. A controllable reverse current path 38 in series with a resistor 39 is connected between plates 22 and 23.

A third electrode 34 is immersed in the electrolyte for monitoring the potential of either the negative plate 22 or the positive plate 23 or both of these plates. The third electrode 34 is connected to one input terminal of a voltage sensing circuit 35 for measuring the potential of the negative plate and to one input of a voltage sensing circuit 36 for measuring the potential of the positive plate. The output of the voltage sensing circuits 35 and 36 may be connected through a line 37 to the switch 27 to control the operation thereof. Additionally, the voltage sensing circuits 35 and 36 are connected through line 37 to the controllable reverse current path 38 which is connected between the positive plate 23 and negative plate 22 in series with resistor 39. Resistor 39 provides a means for sensing the reverse current through the plates during the depolarization step, which reverse current is monitored by a current sensing circuit 40 connected across resistor 39. The output of current sensing circuit 40 is connected through line 41 to switch 27 to control its operation. The voltage across the two plates is monitored by a voltage sensing circuit 42 connected between the positive and negative plates. The voltage sensing circuit 42 has an output on line 43 which is connected to current regulator 25 to control the operation of current regulator 25 and an output on line 44 which is connected to switch 27 to control the operation of switch 27.

The apparatus of FIG. 2 further includes a means for sensing the specific gravity of the electrolyte which includes a light source 45, a photosensitive device 46, and a hydrometer 47 with the hydrometer being immersed in the electrolyte 21 and the light source and photosensitive device being responsive to the position of a bulb 48 in the hydrometer 47. The light source is connected between a source of voltage VI and ground reference. The photosensitive device is connected through a line 50 to an electronic circuit 51 that is responsive to the signal from photosensitive device 46. Electronic circuit 51, in response to the output of photosensitive device 46, controls the operation of switch 27 through a line 52. The apparatus further includes a bridge circuit 53 for monitoring the temperature of either of the plates or the electrolyte during formation. The bridge circuit has in one arm a temperature sensing element 54 in thermal contact with either plate 22 or plate 23 or the electrolyte 21. The output of bridge circuit 53 is connected to an electronic circuit 55 which controls the operation of switch 27 through a line 56. Two opposite terminals of bridge 53 are connected between a voltage source V2 and ground reference.

The apparatus further includes a controller 60 for applying a preselected formation program to the positive plate 23 and negative plate 22. The controller 60 controls the operation of switch 27 through line 61 and reverse current path 38 through line 62. Alternatively, the controller 60 may control the operation of a relay 63 through a line 64. The relay 63, when employed, is magnetically coupled to the movable contacts 29 and 33 for the control of the position of these contacts. Associated with movable contact 29 is an upper fixed contact 64 and associated with movable contact 33 is an upper fixed contact 65. The movable arms may be moved between the upper and lower contacts manually or magnetically by the operation of relay 63 for reversing the polarity of the voltage applied to the plates 22 and 23.

The source of formation current 30 may be any direct current source which has sufficient capacity to supply the desired formation current which, in accordance with this invention, is in excess of 10 amperes per square foot of positive plate surface area. This current may be applied to the plates by employing a constant current source or by employing a current regulator, such as current regulator 25, or the current may be permitted to vary in response to the resistance of the plates 22 and 23 and of the electrolyte 21 and of the combination thereof.

Any one of the characteristics of the plates and electrolyte which change during formation may be monitored to intermittently depolarize the plates and electrolyte in response to the attainment of a predetermined value of the monitored characteristic. For example, the temperature of the electrolyte may be monitored by the employment of thermal sensitive device 54 in bridge circuit 53 and electronic circuit 55, as shown in FIG. 2. As the formation progresses, the temperature of the electrolyte will increase and particularly as polarization takes place during formation. At a predetermined or preselected value of temperature, which may be sensed by the thermal sensitive device 54 in the bridge circuit 53, the electronic control 55 produces an output to open switch 27 to remove the application of formation current and to close the reverse current path 38 to depolarize the plates and electrolyte. The interval of time during which the plates and electrolyte are depolarized by the application of the reverse current path 38 may be a preselected interval or may be dependent upon a predetermined change in one of the characteristics of the plates and electrolyte. Preferably, the most sensitive characteristic or the one that most easily reflects the removal of the polarization effects will be monitored for controlling the depolarization interval.

The temperature may be employed to control the duration of the depolarization step through the operation of thermal sensitive device 54, bridge circuit 53, and electronic control circuit 55 in the same way that these elements operate to remove the formation current which terminates the formation interval and applies the reverse current path, which begins the depolarization interval. Alternatively, the plate potential of either plate may be monitored to terminate a formation interval and to begin and terminate a depolarization interval through the operation of either negative potential sensor 35 or positive potential sensor 36 and the third electrode 34.

The control of the formation intervals and the control of the depolarization intervals may be accomplished automatically by employment of the electronic control circuits as shown in FIG. 2, or they may be controlled manually by observing the temperature of the electrolyte or of a plate, the potential of one of the plates, the voltage across the plates, the color of the plates, the amount of gassing taking place, or the specific gravity of the electrolyte during formation and during the depolarization step. Upon visually monitoring one of these characteristics, the switch 27 may be opened or closed manually and the reverse current path 38 may be opened or closed manually. Alternatively, the movable contacts 29 and 33 may be selectively moved between the fixed contacts to change the polarity of the source with respect to the plates 22 and 23. During formation the movable contacts will be in the position shown in FIG. 2, while during the depolarization step the movable contacts 29 and 33 will be moved to the upper position to make contact with the upper fixed contacts 64 and 65 to reverse the current through the plates 22 and 23.

The steps of applying a formation current during a formation interval and reversing the current through the plates in a depolarization interval are repeated until the formation of the plates is completed. The completion of the formation may also be determined by monitoring, either visually or automatically, one of the characteristics of the plates or electrolyte. For example, the color of the plates is an excellent indicator of the completion of formation in that the negative plate becomes a gray spongy lead and the positive plate becomes a dark brown lead dioxide upon formation.

Figures 3, 4, 5:
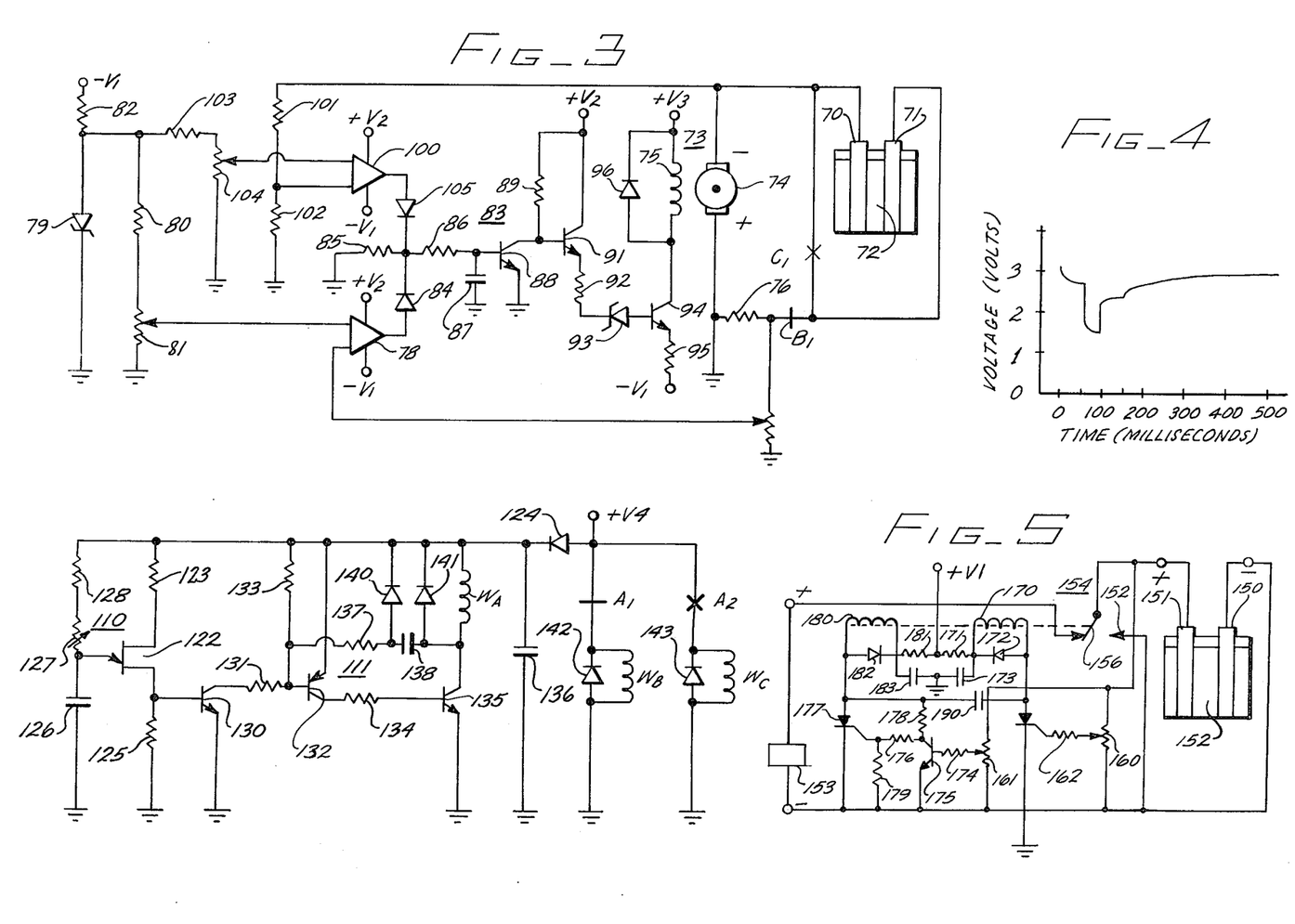
FIG. 3 is a schematic diagram of an apparatus for forming plates according to a preselected program in accordance with this invention.
FIG. 4 is a chart depicting the cell voltage variation during current reversal.
FIG. 5 is a schematic diagram of an apparatus for forming plates in response to a characteristic of the plates and electrolyte.

Apparatus for forming plates according to a program is schematically shown in FIG. 3. The plates to be formed are representatively shown by a negative plate 70 connected as the cathode in an electrolytic bath 72 and by a positive plate 71 connected as the anode in the electrolytic bath 72. The plates may be singular plates or a plurality of plates connected as shown in FIG. 3. The source of formation current is direct current generator 73 having an armature 74 and a shunt field winding 75. The negative output terminal of the armature 74 is connected directly to the negative plate 70 and the positive output terminal of the armature 74 is connected through a resistor 76 and a normally closed contact $B_1$ to the positive plate 71. Resistor 76 provides a means for monitoring the current applied to the plates during formation.

The direct current generator 73 is associated with a control circuit shown schematically to the left of the armature 74, which control circuit may provide either a constant current output at the output of the generator 73 or a constant voltage output at the output of the generator 73. The constant current control circuit includes the resistor 76 in the formation current path. The constant current control circuit also includes a potentiometer 77 connected between the resistor 76 and the contact $B_1$ and ground reference. The movable arm of the potentiometer 77 is connected to one input of a comparator circuit 78. The other input of the comparator circuit 78 is connected to a voltage reference provided by a Zener diode 79 and a voltage divider circuit of a resistor 80 and a potentiometer 81 connected in series across the Zener diode 79. The parallel combination is connected through a resistor 82 to a voltage source VI. The output of the comparator circuit 78 is amplified by amplifying circuit 83 to control the field current of the generator 73. The output of comparator 78 is connected through a diode 84 in series with a resistor 85 to ground reference. A resistor 86 is connected between the junction of diode 84 and resistor 85 and ground reference through a capacitor 87. The base of a transistor 88 is connected to the junction of resistor 86 and capacitor 87. The emitter of transistor 88 is connected directly to ground reference and the collector of transistor 88 is connected through a resistor 89 to a voltage source V2. A second transistor 91 in the amplifying circuit 83 has its base connected to the collector of transistor 88. The collector of transistor 91 is connected directly to voltage source V2. The emitter of transistor 91 is connected through a resistor 92 and a Zener diode 93 in series to the base of a transistor 94. Transistor 94 is connected in the current path of the shunt field winding 75 and functions as a variable resistance in this path. The shunt field winding is connected in series with the collector emitter path of transistor 94 between a voltage source V3 and a voltage source V1. A diode 96 is connected directly across the shunt field winding 75 to protect the transistor 94 from currents when the field collapses in the shunt field winding 75. The constant voltage control circuit includes a comparator 100 for comparing the cell voltage across the plates 70 and 71 to a reference voltage. The cell voltage and the negligible voltage drop across shunt resistor 76 appear across the series combination of a series resistor 101 and a resistor 102. The series combination of resistors 101 and 102 are connected between ground reference and negative plate 70. The junction of resistors 101 and 102 is connected to one input terminal of comparator 100. The other input terminal of comparator 100 has the reference voltage applied thereto, which is developed across the series combination of a resistor 103 and a potentiometer 104 connnected across Zener diode 79. The output of comparator 100 is coupled through a diode 105 to the amplifier 83, which controls the resistance presented by transistor 94 in the current path of shunt field winding 75. In practice, either comparator 78 or 100 will be operational, depending on whether a constant current source is desired or a constant voltage source is desired. Assuming that the plates 70 and 71 are to be formed from a constant current source, the comparative circuit 78 will be operational in the following manner.

The formation current through shunt resistor 76 will be monitored across potentiometer 77. The voltage developed across potentiometer 77 will be directly related to the magnitude of the current through shunt resistor 76 and a portion of this voltage will be applied to comparator circuit 78 for comparison with a reference voltage applied to the other input of the comparator 78. The output of the comparator 78 is at a preselected level for the desired formation current. If the formation current increases above the desired formation current, the otuput of the comparator 78 will increase to cause increased conduction through transistor 88. Increased conduction through transistor 88 will cause decreased conduction through transistor 91. Decreased conduction through transistor 91 will cause decreased conduction through transistor 94 to present a higher resistance in the current path for the shunt field winding 75. This higher resistance in the current path for shunt field winding 75 will decrease the current through this winding to decrease the output of the generator 73. A decrease in the output of generator 73, of course, will cause a decrease in the formation current to bring the formation current back down to the desired level. On the other hand, if the formation current is below the desired level, this will be detected by the voltage developed across potentiometer 77 and applied to comparator 78. This will cause the output of comparator 78 to decrease, which will cause decreased conduction through transistor 88 and increased conduction through transistor 91. The increased conduction through transistor 91 will cause increased conduction through transistor 94 to lower the resistance in the current path for shunt field winding 75. Thereupon the current through shunt field winding 75 will increase to increase the output of the generator 73 to bring the formation current up to the desired level, producing a constant current output.

If a constant voltage source is desired, comparator 100 will be made operational so that the voltage across the cell will be compared with the reference voltage at the input to comparator 100 to produce on output from comparator 100. The output of comparator 100 biases the transistor of amplifier 83 in a similar manner to the output of comparator 78 to effect a constant voltage output from generator 73. The apparatus of the upper portion of FIG. 3 described above applies formation current to the plates 70 and 71 through the normally closed contact $B_1$ from either a constant current source or a constant voltage source. The formation current is at a current density to provide rapid formation of the plates. For plates to be used in lead-acid batteries, this current density will advantageously be in excess of 150 milliamperes per square inch of positive plate surface area. For very rapid formation, the formation current supplied by the direct current generator 73 is of sufficient magnitude to provide a current density of formation current of 3.4 amperes per square inch of positive plate surface area. With high density formation currents, it is advantageous to intermittently depolarize the plates and electrolyte to enhance the ability of the plates to be rapidly formed. The intermittent depolarization is provided in the apparatus of FIG. 3 by the apparatus below the above described apparatus. The apparatus includes a relaxation oscillator 110 controlling the operation of a multivibrator 111. The relaxation oscillator 110 determines the frequency of current reversal or depolarization, while the multivibrator 111 determines the duration of the depolarizing step. Relaxation oscillator 110 comprises a unijunction transistor 112. One base of the unijunction transistor is connected through a resistor 123 and a diode 124 to a voltage supply V4. The second base of unijunction transistor 112 is connected through a resistor 125 to ground reference. The emitter of the transistor 122 is connected through a capacitor 126 to ground reference and through a variable resistor 127 in series with a resistor 128 to the cathode of diode 124. A transistor 130 has its base connected to the bottom base of unijunction transistor 122 and its emitter connected to ground reference. The collector of transistor 130 is connected through a resistor 131 to the base of a transistor 132, which transistor forms a part of the multivibrator 111. The base of transistor 132 is connected through a resistor 133 to the cathode of the diode 124. The emitter of transistor 132 is also connected to the cathode of diode 124. The collector of transistor 132 is connected through a resistor 134 to the base of a transistor 135, which is the other active element of the multivibrator 111. The emitter of transistor 135 is connected to ground reference and the collector is connected through the winding of a relay $W_A$ to the cathode of diode 124.

A capacitor 136 is connected across the series connection of winding $W_A$ and the collector emitter junction of transistor 135. The multivibrator 111 also includes the series connection of a resistor 137 and a capacitor 138 connected between the base of transistor 132 and the collector of transistor 135. A diode 140 is connected between the junction of resistor 137 and capacitor 138 and the cathode of diode 124. Another diode 141 is connected directly across the relay winding $W_A$. The relay $W_A$ has two contacts, a normally closed contact $A_1$ and a normally open contact $A_2$. Contact $A_1$ is connected between the voltage source V4 and ground reference through a relay winding $W_B$. A diode 142 is connected directly across the relay winding $W_B$. The normally open contact $A_2$ is connected between the voltage source $V_2$ and ground reference through a relay winding $W_C$. A diode 143 is connected directly across winding $W_C$. Winding $W_B$ controls normally closed contact $B_1$ in the formation current path from generator 73 to the plates 70 and 71. A reverse current path or depolarization path is provided between the plates 70 and 71 through normally open contact $C_1$. Contact $C_1$ is controlled by winding $W_C$. Upon the application of voltage from sources $V_1$, $V_2$, $V_3$, and $V_4$ to the apparatus of FIG. 3, which voltages may be supplied by a regulated power supply, field current is supplied to the generator and formation current begins to flow through the plates. Also upon the application of the voltage from source $V_4$, the timing capacitor 126 in relaxation oscillator 110 begins to charge and after a predetermined time reaches the value to fire unijunction transistor 122. Capacitor 126 discharges through resistor 125 to present a pulse to the input of multivibrator 111. Multivibrator 111 will change states, turning transistor 135 on and transistor 132 off for a preselected interval of time.

In one illustrative example, multivibrator 111 has a switch time of 50 milliseconds, which establishes the depolarizing interval for the apparatus of FIG. 3. When transistor 135 turns on, relay winding $W_A$ will be energized to open contact $A_1$ and to close contact $A_2$. The closing of contact $A_2$ causes the energization of relay winding $W_C$. The opening of contact $A_1$ and the deenergization of relay winding $W_B$ causes normally closed contact B1 to open to remove formation current and to terminate the formation interval. The closing of contact $A_2$ and the resultant energization of relay winding $W_C$ causes the closing of contact $C_1$ to provide a path for reverse current between the negative plate and the positive plate 71 for depolarizing the plates and electrolyte. Relaxation oscillator 110 is adjustable to provide an output once every two seconds down to once every 1 minute. Thus, by adjusting the value of variable resistor 127, the plates may be depolarized at varying repetition rates depending on the repetition rate of the relaxation oscillator 110.

During the depolarizing step, the cell voltage will decrease upon the reversal of current. Assuming a depolarizing interval of 50 milliseconds, the chart of FIG. 4 shows the wave form for the cell voltage upon the opening of contact B1 at time zero on the chart of FIG. 4, and the closing of contact $C_1$ shortly thereafter to depolarize the plates and electrolyte. The cell voltage decreases during the current reversal.

For the very rapid formation of plates, it is desirable to maintain the cell voltage above the decomposition potential of the electrolytic solution during the entire period that formation current is applied. For the purposes of this application, the decomposition potential of the electrolytic solution is the cell voltage at which the water in the electrolytic solution is broken down or decomposed into hydrogen and oxygen gases. This voltage will vary with the materials of the plates being formed. However, in the formation of plates for a lead-acid battery, the decomposition potential is somewhere between 2.3 and 2.4 volts per cell.

In one specific embodiment of the invention, the cell voltage is only maintained above a decomposition potential of the electrolytic solution during the application of formation current, but the cell voltage is maintained above the open circuit voltage during the depolarization step. This is accomplished in the apparatus of FIG. 5 by sensing both the cell voltage at which formation current is interrupted and the depolarizing step begins and cell voltage for ending the depolarizing step and for reapplying formation current. The apparatus of FIG. 5 includes a negative plate 150 and a positive plate 151 immersed in an electrolytic solution 152 connected to a source 153 of formation current through a controllable switch 154. The operation of the switch 154 is controlled by a control circuit 155, which monitors the cell voltage for interrupting the formation current and depolarizing the plates and electrolyte and for ending the depolarizing step and reapplying the formation current. The controllable switch 154 is in the position for applying formation current and the movable contact 156 is in contact with a fixed contact 157. A fixed contact 158 provides a reverse current path in cooperation with movable contact 156 of switch 154.

During the application of formation current from source 153, the cell voltage is monitored. A potentiometer 160 is connected between the positive and negative plates 151 and 150 respectively. A second potentiometer 161 is connected in parallel with potentiometer 160. The movable contact of potentiometer 160 is connected through a resistor 162 to the gate of a silicon controlled rectifier 163. The cathode of the silicon controlled rectifier 163 is connected to ground reference. The anode of silicon controlled rectifier 163 is connected through a relay winding 170 in series with a resistor 171 to a voltage source V1. Diode 172 is connected directly across the winding 170. A capacitor 173 is connected between the junction of winding 170 and resistor 171 and ground reference. The movable contact of potentiometer 161 is connected through resistor 174 to the base of a transistor 175. The emitter of transistor 175 is connected to ground reference. The collector of transistor 175 is connected through a resistor 176 to the gate of a silicon controlled rectifier 177 and through a resistor 178 to the anode of silicon controlled rectifier 177. The gate of silicon controlled rectifier 177 is connected through resistor 179 to ground reference and the cathode is connected directly to ground reference. The anode of rectifier 177 is connected to the anode of rectifier 163 through a capacitor 190. The anode of silicon controlled rectifier 177 is also connected through a relay winding 180 in series with a resistor 181 to voltage source V1.

A diode 182 is connected directly across the winding 180. A capacitor 183 is connected between the junction of winding 180 and resistor 181 and ground reference. The windings 170 and 180 function to move the movable contact 156 between the fixed contacts 157 and 158 of switch 154. Energization of winding 170 through silicon controlled rectifier 163 will cause the movable contact 156 to make contact with fixed contact 158 to start the depolarizing step by the application of a reverse current path. The energization of winding 180 through silicon controlled rectifier 177 will cause movable contact 156 to make contact with fixed contact 157 as shown in FIG. 5 to apply formation current to the plates 150 and 151.

In the operation of the apparatus of FIG. 5, transistor 175 functions to bypass the triggering current for silicon controlled rectifier 177 so that this rectifier cannot turn on. The transistor 175 bypasses this triggering current as long as the cell voltage is above a preselected value, such as 2.15 volts when forming plates for lead-acid batteries. As long as the cell voltage is above the preselected value, sufficient bias will be applied to transistor 175 to prevent the turning on of the rectifier 177. During the application of formation current, the cell voltage will increase so that the triggering current applied to silicon controlled rectifier 163 in the movable contact of potentiometer 160 will increase. At a preselected level of cell voltage, such as 2.9 volts for the formation of plates for lead-acid batteries, silicon controlled rectifier 163 will turn on. The turning on of rectifier 163 will cause current to flow through winding 170 from source V1 to energize this winding. The energization of winding 170 will cause the movable contact 156 to break contact with contact 157 and to make contact with contact 158. The closing of contact 158 applies a reverse current path across the plates 150 and 151 to depolarize the plates. The cell voltage during depolarization is monitored by transistor 175 through its base connection to potentiometer 161. As the cell voltage decreases and reaches a preselected level, the transistor 175 will decrease in conductivity to the point where silicon controlled rectifier 177 will be biased on through the bias current from source V1, applied through resistor 181, relay 180, and resistors 178, 176 and 179. The turning on of silicon controlled rectifier 177 will cause increased current flow through winding 180 to energize this winding to move the movable contact path to its original position, as shown in FIG. 5, for the reapplication of formation current. The firing of silicon controlled rectifier 177 will also turn off silicon controlled rectifier 163 through capacitor 190. Silicon controlled rectifier 163 will remain off until the cell voltage again reaches the preselected value, for example, 2.9 volts during the formation of plates for lead-acid batteries.

Not only may plates be rapidly formed, but plates may be formed in the electrolytic solution of the battery. To form the plates in the same electrolytic solution that is to be employed with the plates in the final product, the plates to be formed are immersed in an electrolytic solution having a specific gravity in excess of 1.120. In forming plates to be used in lead-acid batteries subjected to normal use, the specific gravity of the forming electrolytic solution will be approximately 1.220. However, where the plates are for use in a battery to be used in a relatively high temperature environment, such as the tropics, the forming solution will have a specific gravity of approximately 1.180. After the formation, the respective specific gravities will have increased to approximately 1.280 and approximately 1.220. The use of the relatively high specific gravity forming solution, rather than the typical 1.070 to 1.100 specific gravity dilute solution, eliminates the need to dump the solution, wash the plates, refill the container, and to condition the plates immersed in the new solution. Thus, many steps may be omitted in the manufacture of lead-acid batteries.

Additionally, it is possible to form plates for batteries, and in particular lead-acid batteries, in the battery container itself. In this process the plates and their separators are inserted in the battery container and the entire battery assembled. Thereafter the electrolytic solution is added. Advantageously this solution will have a high initial specific gravity and will remain in the battery after formation.

Various changes may be made in the details of construction without departing fromt the spirit and scope of the invention as defined by the appended claims.

What is claimed is:

1. A method for forming battery plates by an electrochemical formation reaction comprising the steps of:
    immersing unformed positive and negative plates in a formation electrolyte;
    passing a formation current having a density in excess of 50 amperes per square foot of positive plate surface covered by electrolyte through the plates and formation electrolyte; and,
    intermittently reversing the current through the plates for a period sufficient to depolarize the plates and electrolyte without effecting a significant change in extant quantities of non-ionic reaction products of the formation reaction.

2. The method of claim 1 wherein the time interval during which the formation current is passed between reversals is a predetermined constant.

3. The method of claim 2 wherein the time interval during which current is reversed is predetermined.

4. The method of claim 3 wherein the interval of time of current reversal is less than 1 percent of the preceding time interval during which formation current is passed.

5. The method of claim 1 including the steps of monitoring a condition of a positive plate and controlling the reversal of formation current responsively thereto.

6. The method of claim 5 wherein the density of the formation current is in excess of about 100 amperes per square foot of positive plate surface covered by electrolyte.

7. A method of electrochemically forming a battery comprising:
    assembling unformed positive plates including at least one pasted positive plate with an outer surface comprising lead, lead dioxide and lead sulfate and unformed negative plates including at least one pasted negative plate with an outer surface comprising lead dioxide and lead sulfate and separators for a battery in a battery container;
    adding an electrolyte to said container;
    passing a formation current having a density of not less than 20 amperes per square foot of positive plate surface covered by the electrolyte through the unformed plates and electrolyte;
    monitoring at least one physical characteristic of the battery indicative of the progress of the formation reaction; and,
    reversing the current through the plates responsively to the monitored characteristic to depolarize the plates and electrolyte without effecting a significant change in extant quantities of non-ionic reaction products of the formation reaction to thereby convert the negative plates to spongy lead and the positive plates to lead dioxide.

8. The method of claim 7 wherein said formation electrolyte comprises an aqueous sulfuric acid solution having a specific gravity in excess of 1.150 and wherein the current density of the formation current is not less than about 50 amperes per square foot of positive plate surface covered by the electrolyte.

9. The method of claim 7 wherein the current density of the formation current is not less than about 100 amperes per square foot of positive plate surface covered by the electrolyte.

10. A method of electrochemically forming battery plates comprising:
immersing unformed battery plates in an electrolyte;
passing a formation current through the plates and electrolyte; and,
intermittently reversing the current through the plates and electrolyte for an interval of time sufficient to depolarize the plates and electrolyte without significantly discharging the battery.

11. The method of claim 10 comprising the further steps of monitoring at least one physical characteristic of the battery indicative of the rate of a formation reaction and reversing the formation current responsively to the occurrence of a preselected value in the monitored characteristic.

12. The method of claim 10 wherein the current reversal occurs not less than three times an hour and wherein the periods of current reversal occurs more frequently as the formation progresses.

13. The method of claim 12 wherein the formation current has a density in excess of 50 amperes per square foot of positive plate surface covered by electrolyte.

14. The method of claim 10 wherein the formation current has a density in excess of 100 amperes per square foot of positive plate surface covered by electrolyte and wherein the interval of time of current reversal is less than 1 percent of the immediately preceding time interval during which formation current was passed.

* * * * *